US009317781B2

(12) United States Patent
Tu et al.

(10) Patent No.: US 9,317,781 B2
(45) Date of Patent: Apr. 19, 2016

(54) MULTIPLE CLUSTER INSTANCE LEARNING FOR IMAGE CLASSIFICATION

(71) Applicant: Microsoft Technology Licensing, LLC, Redmond, WA (US)

(72) Inventors: Zhuowen Tu, Beijing (CN); Yan Xu, Beijing (CN); Junyan Zhu, Pittsburgh, PA (US); Eric I-Chao Chang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 13/804,111

(22) Filed: Mar. 14, 2013

(65) Prior Publication Data

US 2014/0270495 A1 Sep. 18, 2014

(51) Int. Cl.
G06K 9/62 (2006.01)
G06T 7/00 (2006.01)

(52) U.S. Cl.
CPC ............ G06K 9/6259 (2013.01); G06T 7/0081 (2013.01); G06T 7/0087 (2013.01); G06T 2207/20081 (2013.01); G06T 2207/20141 (2013.01)

(58) Field of Classification Search
None
See application file for complete search history.

(56) References Cited

U.S. PATENT DOCUMENTS

| 7,822,252 | B2 | 10/2010 | Bi et al. |
| 8,010,471 | B2 | 8/2011 | Zhang et al. |
| 2008/0125648 | A1* | 5/2008 | Bi et al. ........................ 600/425 |
| 2009/0290802 | A1 | 11/2009 | Hua et al. |
| 2010/0158356 | A1* | 6/2010 | Ranzato et al. ............... 382/159 |
| 2011/0064301 | A1* | 3/2011 | Sun et al. ...................... 382/159 |
| 2011/0280457 | A1 | 11/2011 | Nielsen et al. |

OTHER PUBLICATIONS

Yin et al. "Cell Segmentation in Microscopy Imagery Using a Bag of Local Bayesian Classifiers." IEEE International Symposium on Biomedical Imaging: From Nano to Macro, Apr. 14, 2010, pp. 125-128.*
Wang et al. "Joint Learning of Visual Attributes, Object Classes and Visual Saliency." 12th International Conference on Computer Vision, Sep. 29, 2009, pp. 537-544.*
Dundar et al., "A Multiple Instance Learning Approach toward Optimal Classification of Pathology Slides", In Proceedings of 20th International Conference on Pattern Recognition, Aug. 23, 2010, 4 pages.
Xu et al., "Contexts-Constrained Multiple Instance Learning for Histopathology Image Analysis", In Proceedings of Medical Image Computing and Computer Assisted Intervention, Oct. 1, 2012, 8 pages.
Xu et al, "Multiple Clustered Instance Learning for Histopathology Cancer Image Classification, Segmentation and Clustering", In Proceedings of IEEE Conference on Computer Vision and Pattern Recognition, Jun. 2012, 8 pages.
Zhu et al., "Unsupervised Object Class Discovery via Saliency-Guided Multiple Class Learning", In Proceedings of IEEE Conference on Computer Vision and Pattern Recognition, Jun. 16, 2012, 8 pages.

* cited by examiner

*Primary Examiner* — Jon Chang
(74) *Attorney, Agent, or Firm* — Sandy Swain; Micky Minhas (57) ABSTRACT

The techniques and systems described herein create and train a multiple clustered instance learning (MCIL) model based on image features and patterns extracted from training images. The techniques and systems separate each of the training images into a plurality of instances (or patches), and then learn multiple instance-level classifiers based on the extracted image features. The instance-level classifiers are then integrated into the MCIL model so that the MCIL model, when applied to unclassified images, can perform image-level classification, patch-level clustering, and pixel-level segmentation.

20 Claims, 5 Drawing Sheets

MULTIPLE CLUSTER INSTANCE LEARNING FOR IMAGE CLASSIFICATION

BACKGROUND

Due to the increase in the availability of digital images (e.g., Internet images, medical images, personal photographs), image classification models are often used to label a large number of images. In one example, image classification models may be used to provide a single high-level label of a histopathology image (e.g., whether it contains cancerous tissue or not). In another example, images classification models may be used to associate images on the Internet with a search term or terms (e.g., bike, bird, tree, football, etc.).

Conventional approaches to building an image classification model rely on strongly supervised learning that require detailed manual annotations of multiple different visual concepts in images (e.g., different objects in photo, cancerous regions in image, type of cancer, etc.) to ensure accurate labeling. Therefore, the conventional approaches are labor-intensive and time-consuming due to the large amount of human involvement, which may not be feasibly scalable to a large number of images that may contain multiple different visual concepts.

SUMMARY

The techniques and systems described herein create and train a multiple clustered instance learning (MCIL) model based on image features and patterns extracted from training images. The techniques separate each of the training images into a plurality of instances (or patches), and then learn multiple instance-level classifiers based on the extracted image features. The instance-level classifiers are then integrated into the MCIL model so that the MCIL model, when applied to unclassified images, can perform image-level classification, patch-level clustering, and pixel-level segmentation.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or arrangement(s) as permitted by the context above and throughout the document.

BRIEF DESCRIPTION OF THE DRAWINGS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

The following description sets forth techniques and systems that create and train a multiple clustered instance learning (MCIL) model. The MCIL model may be trained and configured to perform image-level classification, patch-level clustering, and pixel-level segmentation in an integrated framework. Image-level classification is associated with a high-level determination that corresponds to the overall image (e.g., whether or not a histopathology image has cancerous tissue, whether or not an Internet image is broadly associated with a search query, etc.). Patch-level clustering is associated with a mid-level determination that discovers and identifies different types of objects that may be a subclass or component of the high-level image classification (e.g., different types of cancerous tissue, individual parts of a larger object that is the focus of a search query). Pixel-level segmentation locates and outlines regions within the image that contain the smaller objects identified in the patch-level clustering.

In various embodiments, the techniques train the MCIL model in a "weakly" supervised machine learning environment that does not require as much human involvement (e.g., detailed annotations) compared to the conventional approaches discussed above. The weakly supervised environment includes training data (e.g., a set of images) that are associated with human provided labels indicating an image level classification (e.g., whether an image has cancerous tissue or not, whether an image broadly relates to a search query, etc.). Thus, the term "weakly" is used because the human provided labeling is performed at a high level (e.g., the image-level classification), while the MCIL model automatically learns and integrates classifiers that are used to detect and discover different objects (e.g., subclass or component of the high-level image classification) at the patch-level by clustering a group of image patch samples.

Therefore, the training data may be used in an unsupervised environment to learn classifiers for patch-level clustering. Once the MCIL model is trained, the MCIL model may be applied to unlabeled or unclassified images and the MCIL model may simultaneously perform, in an integrated framework, the image-level classification, the patch-level clustering, and the pixel-level segmentation. For example, application of the MCIL model may be useful in medical imaging (e.g., determination of cancerous tissue), web-based image searches (e.g., identifying Internet images that are relevant to a search query), photo sorting (e.g., identifying a group of photos in a personal digital library that contain a particular person, event, action, and so forth), and any other environments where one may want to separate and/or identify images based on the visual content contained therein.

For the purpose of this document, image classification is discussed using the term "images". However, it is understood in the context of this document that an image may correspond to static images, videos, photos, documents, text, or any type of electronic information with visual features and/or patterns that can be i) extracted and learned by the MCIL model, and then ii) detected by the MCIL model when applied to an unclassified or unlabeled image. Thus, the term "images", as used in this document, encompasses multiple different types of electronically available visual information.

As discussed herein, the visual features and/or patterns extracted and learned by the MCIL model and used to classify images may include, but are not limited to, features associated with color of the image, texture of the image, shape of the image, spatial distribution of the image, and the like. Several visual mechanisms that aid in extracting, deriving and comparing visual features and/or patterns of images include, for example: scale-invariant feature transform (SIFT), histogram of gradient (HoG), local binary pattern (LBP), L*a*b color histogram, attention guided color signature, color spatialet, wavelet, multi-layer rotation invariant, facial features, or any other visual feature and/or pattern extraction mechanism or combination of mechanisms.

Overview

Figure 1:
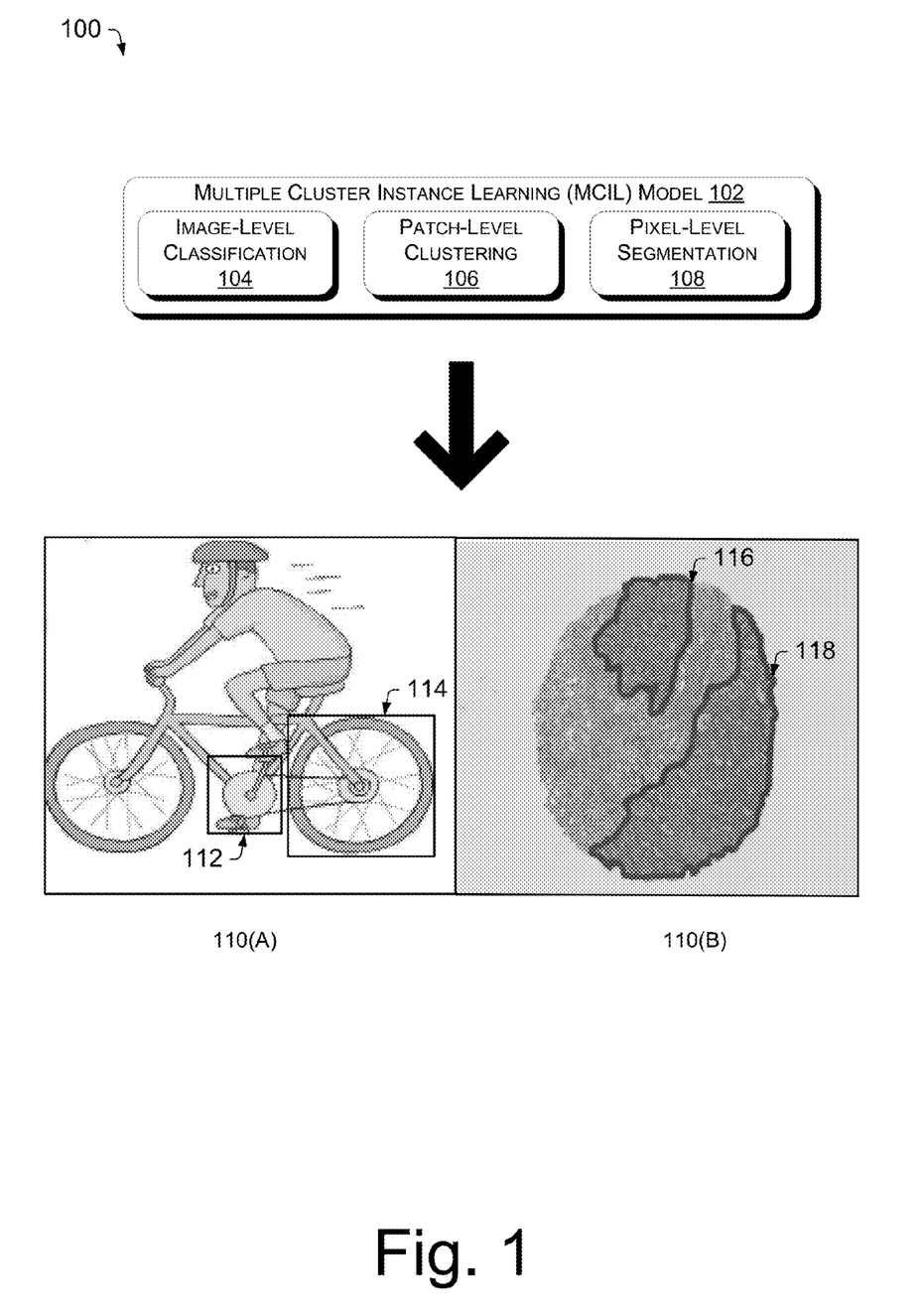
FIG. 1 illustrates an example overview that depicts elements of a multiple clustered instance learning (MCIL) model, in accordance with various embodiments described herein.

FIG. 1 illustrates an example overview 100 of the how the MCIL model 102 may be applied to classify images, discover and identify patch-level clusters that are associated with different objects (e.g., subclasses, parts or components of a high-level image classification), and visually locate and segment the objects at the pixel-level. Thus, as discussed above, the MCIL model 102 includes functionality and/or algorithms directed to image-level classification 104, patch-level clustering 106, and pixel-level segmentation 108 in a single integrated and unified framework.

The image-level classification 104 of the MCIL model 102 is configured to classify the image at a high level. For example, when applied to image 110(A), the image-level classification 104 of the MCIL model 102 may determine that image 110(A) relates to a search query that specifies "bike" because the image includes a person riding a bike. With respect to the histopathology image 110(B), the image-level classification 104 of the MCIL model 102 may determine that the histopathology image 110(B) contains cancerous tissue (e.g., as outlined by the bold regions).

The patch-level clustering 106 of the MCIL model 102 is configured to identify or discover one or more objects. In various embodiments, the objects may be a subclass or a component of a broader image-level classification. For example, the patch-level clustering 106 may determine that the bike in image 110(A) contains pedals as outlined in window 112 and/or a bike wheel as outlined in window 114. In another example, the patch-level clustering 106 may determine that the tissue illustrated in image 110(B) contains two cancerous regions 116 and 118 that are a particular type or subclass of cancer (e.g., colon, prostate, breast, neuroblastoma, etc.) as determined at the image-level classification. Moreover, the MCIL model 102 may determine that the two cancerous regions 116 and 118 are the same type of cancer or are different types of cancer.

In various embodiments, the pixel-level segmentation 108 of the MCIL model 102 is configured to locate and outline, at the pixel level, the different objects identified and discovered by the patch-level clustering 106. For example, the two regions 116 and 118 in image 110(B) are segmented to show a pixel-level outline of the cancer.

Thus, the MCIL model 102 may be configured to learn one or more algorithms, that when applied to unclassified image (an image without human labeling), can perform image-level classification 104, patch-level clustering 106, and pixel-level segmentation in a unified and integrated framework.

Figure 2:
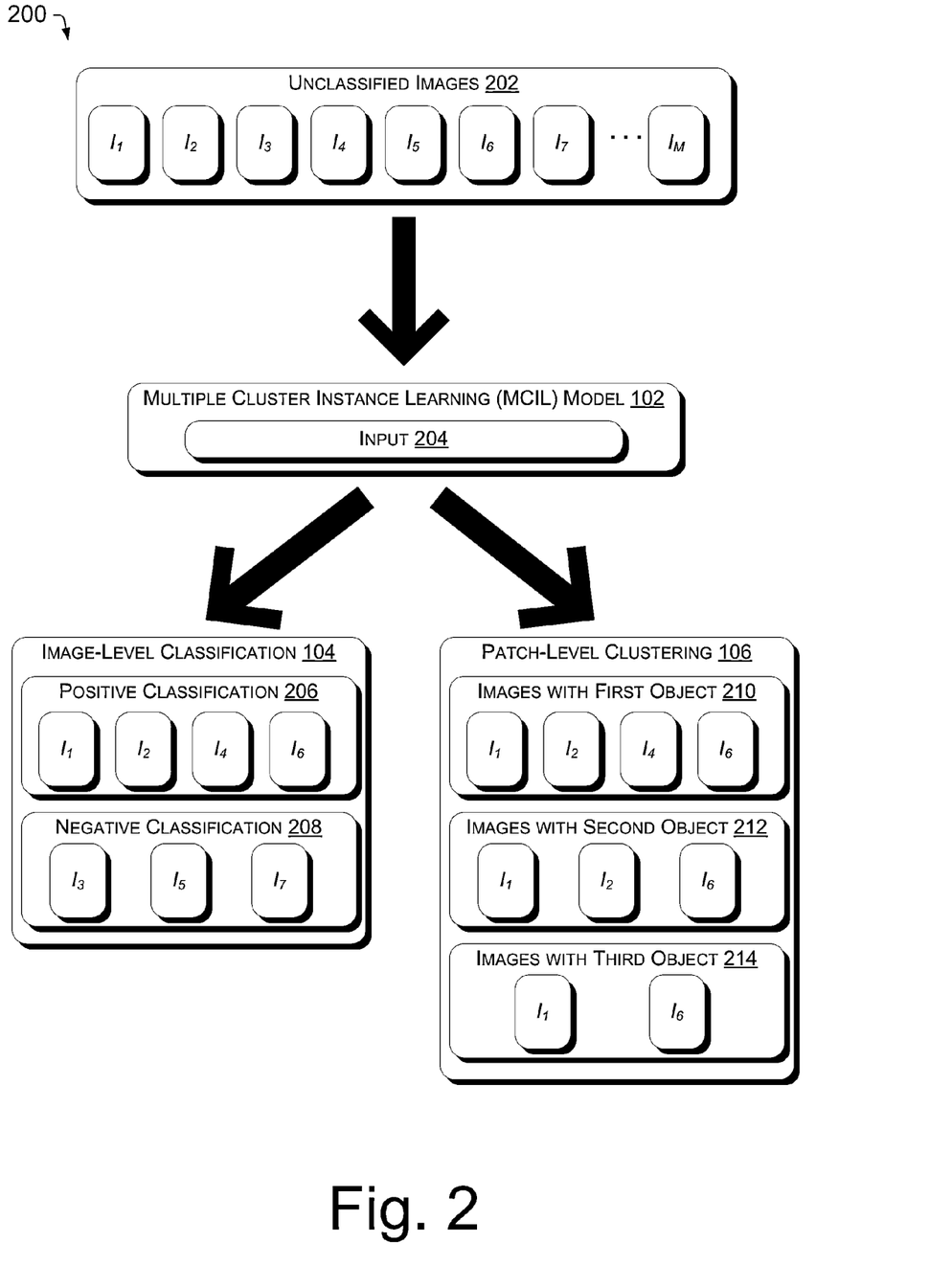
FIG. 2 illustrates an example environment that applies the MCIL model to a set of unclassified images, in accordance with various embodiments described herein.

FIG. 2 illustrates an example scenario 200 where the MCIL model 102 is applied to a set of M unclassified images 202 (e.g., $I_1, I_2 \ldots I_M$). Here, M is an integer number of images that may be a large group (e.g., tens, hundreds, thousands, and so forth) of images. For example, the unclassified images 202 may be medical images at a doctor's office that need to be examined and/or classified for cancer or another disease or defect. Or, the unclassified images 202 may be any number of images located on the Internet that may potentially relate to a search query of one or more terms (e.g., bike, football, sky, flowers, tree, etc.).

In the example scenario 200 of FIG. 2, the unclassified images 202 may be a personal library of photos. Accordingly, the MCIL model 102 may be applied to the unclassified images 202 (as indicated by the down arrow) based on input 204 received. In this example, the input 204 may be provided by a user and may indicate the user is interested in locating photos in the personal library that have at least one person (e.g., opposed to scenic photos without people), and the input 204 may further indicate interest in photos that have faces, arms, and/or legs. Other examples of input 204 may include a type of cancer to discover and identify (e.g., for medical imaging) or a search query input to an image search engine. Thus, the input 204 may include any number of indicators (e.g., one or more words) that convey an image-classification focus or interest.

Based on the input 204, the MCIL model 102 may simultaneously perform the image-level classification 104, the patch-level clustering 106, and the pixel-level segmentation 108 on the unclassified images 202. FIG. 2 illustrates the image-level classification 104 by distinguishing between or separating the images that are associated with a positive classification 206 (e.g., images $I_1, I_2, I_4$, and $I_6$ may contain a person) and images that are associated with a negative classification 208 (e.g., images $I_3, I_5$, and $I_7$ do not contain a person). Moreover, FIG. 2 illustrates the patch-level clustering 106 by distinguishing between or separating the images with a positive classification 206 based on whether the images have a particular object, component or part (e.g., a visual concept). Accordingly, the MCIL model 102 identifies images with a first object 210 (e.g., images $I_1, I_2, I_4$, and $I_6$ may contain faces), identifies images with a second object 212 (e.g., images $I_1, I_2$, and $I_6$ may contain arms), and identifies images with a third object 214 (e.g., images $I_1$ and $I_6$ may contain legs). Thus, as illustrated, some of the images may include one of the objects of interest (e.g., image $I_4$), more than one of the objects of interest (e.g., $I_1, I_2$, and $I_6$), or all of the objects of interest (e.g., images $I_1$ and $I_6$).

In various embodiments, the MCIL model 102, when applied, may also simultaneously perform the pixel-level segmentation as discussed above. Accordingly, the MCIL model 102 may locate and outline the different objects that have been discovered (e.g., the face, arms, legs, etc.).

While the image classification examples provided above relate to web-based image searches, medical imaging, and personal photo libraries, it is understood in the context of this document that the MCIL model 102 can be applied in any environment or field that has an interest in identifying and classifying a particular visual concept in a group of images. Accordingly, the MCIL model 102 can be trained from visual features in training images that are known to contain the objects that relate to the particular visual concept.

Illustrative Architecture

Figure 3:
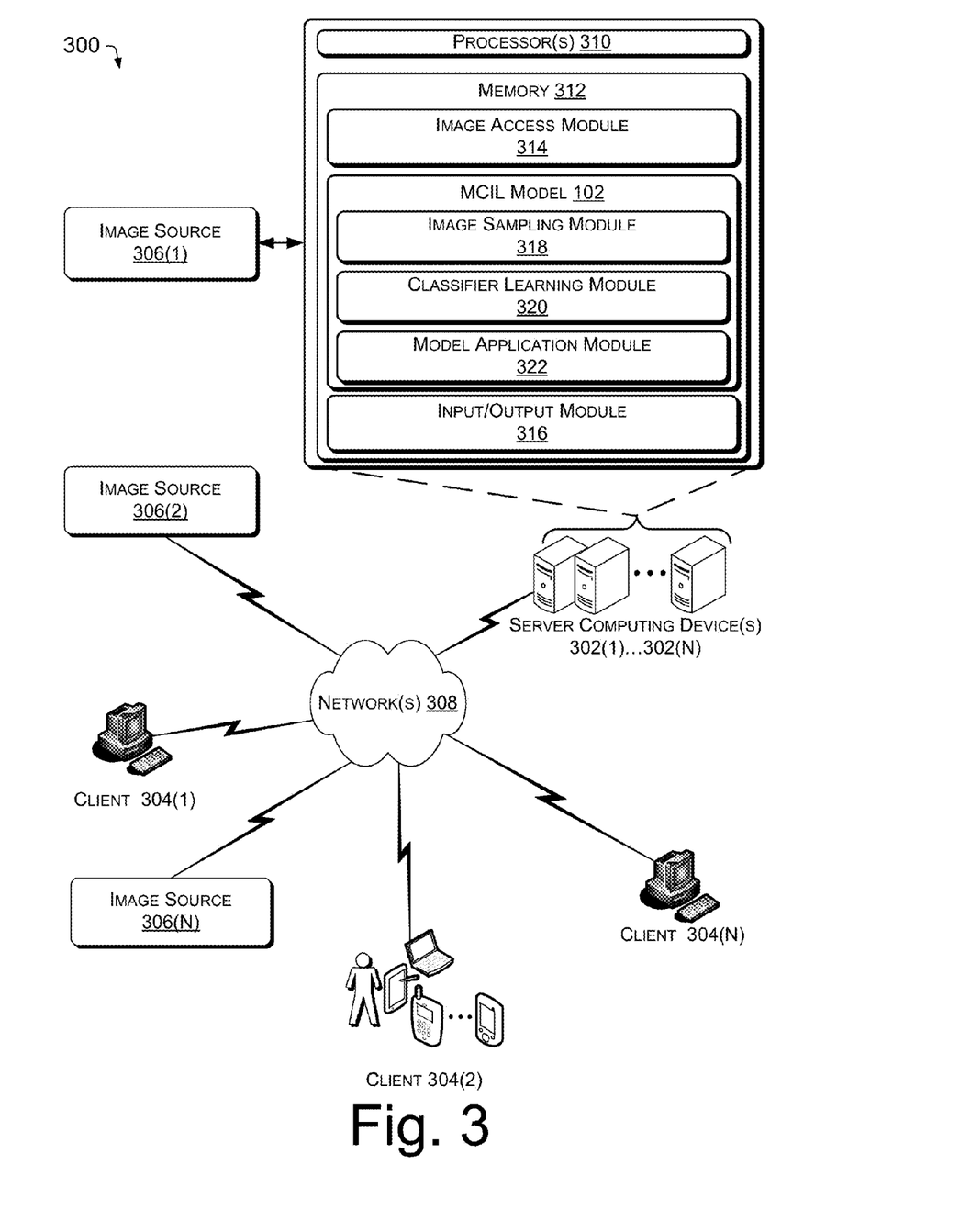
FIG. 3 illustrates an example architecture that builds the MCIL model and applies the MCIL model, in accordance with various embodiments described herein.

FIG. 3 shows an illustrative architecture 300 that implements the described techniques. To this end, architecture 300 includes one or more server computing devices 302(1) . . . 302(N), one or more client computing devices 304(1) . . . 304(N), and one or more image sources 306(1) . . . 306(N), each coupled to network(s) 308. In various embodiments, the server computing devices 302(1) . . . 302(N) may host the MCIL model 102, and therefore, the server computing devices 302(1) . . . 302(N) may be configured in environments that perform image analysis, image classification, image sorting and so forth. Examples of such environments may include, but are not limited to, one or more image-based web search engines, medical offices, personal photo libraries, personal email accounts (e.g., sorting emails based on textual attributes), and so forth.

In various embodiments, a user or other entity may provide the input 204 via a web browser or other application that accepts input at the one or more client computing devices 304(1) . . . 304(N). Thus, the client computing devices 304(1) . . . 304(N) may comprise one of an array of computing devices capable of connecting to the one or more network(s) 308, such as a server computer, a client computer, a personal computer, a laptop computer, a mobile phone, a personal digital assistant (PDA), tablets, gaming consoles, set top boxes, and the like. Moreover, the input 204 may be provided by the user via a graphical user interface (GUI), with the user intent of locating and receiving one or more images relevant to the input 204.

In various embodiments, the architecture 300 can be the World Wide Web, including numerous PCs, servers, and other computing devices spread throughout the world. The server computing devices 302(1) . . . 302(N), the client computing devices 304(1) . . . 304(N), and the image sources 306(1) . . . 306(N) may be coupled to each other in various combinations through a wired and/or wireless network 308, including a LAN, WAN, or any other networking and/or communication technology known in the art. It is understood in the context of this document, that image sources 306(1) . . . 306(N) may include, but are not limited to, any entity configured to store and maintain images. For example, image sources 306(1) . . . 306(N) may be web servers, file transfer servers, image databases, social media servers, photo repositories, etc. Moreover, the image sources 306(1) . . . 306(N) may be local to a server computing device or a client computing device, or the image sources 306(1) . . . 306(N) may be accessible via the network 308 (e.g., cloud computing).

In various embodiments, the server computing devices 302(1) . . . 302(N) comprise one or more processors 310 and memory 312. The memory 312 may include an image access module 314, the MCIL model 102, and an input/output module 316, as further discussed herein. Moreover, the MCIL model 102 may include an image sampling module 318, a classifier learning module 320, and a model application module 322, each of which are further discussed herein.

While the various modules discussed herein are illustrated as being part of the server computing devices 302(1) . . . 302(N), it is understood that the processor(s) 310, memory 312 and the various modules may also be part of the client computing devices 304(1) . . . 304(N). Thus, the functionality performed by the modules as discussed herein may be performed over the network at the server computing devices 302(1) . . . 302(N), the functionality may be performed locally at the client computing devices 304(1) . . . 304(N), or a combination thereof.

The processor(s) 310 may be a single processing unit or a number of units, all of which could include multiple computing units. The processor(s) 310 may be implemented as one or more microprocessors, microcomputers, microcontrollers, digital signal processors, central processing units, state machines, logic circuitries, system on chip (SoC), and/or any other devices that manipulate signals based on operational instructions. Among other capabilities, the processor(s) 310 may be configured to fetch and execute computer-readable instructions stored in the memory 312.

The memory 312 may comprise computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

It is understood in the context of this document, that the functionality performed by the image access module 314, the MCIL model 102, and the input/output module 316 may be all inclusive on a single computing device (e.g., server computing device or client computing device) implementing image analysis and classification, or spread amongst a plurality of computing device(s) connected to one another via network(s) 308. For instance, in one example functionality performed by the MCIL model 102 may be spread across multiple computing devices. In another example, functionality performed by the MCIL model may be entirely on a first computing device, while functionality performed by the image access module 314 may be on a different computing device.

The image access module 314 is configured to collect and/or retrieve images from the image sources 306(1) . . . 306(N). In various embodiments, the image access module 314 is configured to collect training images so that the MCIL model 102 can be trained, as further discussed herein. In at least one embodiment, the image access module 314 collects training images that have been flagged or identified for training. Moreover, the training images are labeled as being positively classified (e.g., the images are known to contain at least one type of cancer, the images are known to contain at least part of a bike, etc.) and/or negatively classified. For example, a pathologist may select a set of training images known to contain different subclasses of cancers so that the MCIL model 102 can be trained to detect the cancer subclasses of interest. In another example, the image access module 314 may collect training images using an image-based search query. Thus, a search engine may return a set of potentially relevant images which can be used to build the MCIL model 102 for the search query (e.g., training classifiers directed to patch-level clustering 106).

In various embodiments, the image access module 314 may also collect a set of unlabeled or unclassified images from the images sources 306(1) . . . 306(N) so that, once learned, the MCIL model 102 can be applied to simultaneously perform image-level classification 104, patch-level clustering 106, and pixel-level segmentation 108 on the set of unlabeled or unclassified images.

In various embodiments, after training images are collected by the image access module 314, the image sampling module 318 of the MCIL model 102 is configured to sample the training images. Thus, the image sampling module 318 determines and separates the individual images into patch samples. For example, a sample patch size may be (64 pixels×

64 pixels), (192 pixels×192 pixels), or any other sample size such that a sample patch contains enough visual data to capture visual features and/or patterns that help the MCIL model 102 build the classifiers.

In various embodiments, the image sampling module 318 may employ saliency detection (e.g., during a training stage or classification stage) to reduce searching space of the training image or an unclassified image and to help identify regions in the images that have the objects of interest for image-level classification and object discovery and identification. Thus, saliency detection may assume that the object of interest is generally salient in an image and the salient detection may filter out regions of the image that are not relevant to a search query, for example. Detecting saliency windows (e.g., windows 112 and 114 in FIG. 1) may be based on an analysis of the significant visual features and relevant patterns in the image. In some embodiments, the image sampling module 318 may also perform complete sampling of the training image and/or random sampling of the training image (e.g., salient windows and non-salient windows).

Using the sample patches from the training images and the visual features and patterns extracted from each sample patch, the classifier learning module 320 may automatically learn (e.g., unsupervised learning) instance-level classifiers for K clusters where K represents a number of objects or subclasses that are associated with the high-level image classification. For example, a pathologist may indicate that he/she is interested in identifying four different types of cancer (e.g., K=4), and thus, the MCIL model 102 may learn instance-level classifiers for the four different types of cancer. The instance-level classifiers are configured to determine that a sample patch (e.g., an instance) belongs to or is part of a particular cluster k. The classifier learning module 320 of the MCIL model 102 learns the instance-level classifiers for patch-level clustering 106 because the mid-level objects may span or cover more than one sample patch. Therefore, the patch-level clustering 106 allows the individual patches (e.g., instances) to be classified and grouped as belonging to the same cluster, based on the visual features and patterns extracted. Once trained, the instance-level classifiers may be applied to unlabeled or unclassified images so that different objects associated with a same image classification can be discovered and/or detected (e.g., different types of cancer, different components of a bike).

Accordingly, by incorporating patch-level clustering, the MCIL model 102 expands on multiple instance learning (MIL). Generally, in MIL, training data consists of a set of bags X. Each bag x may be a training image or a visual concept within a training image to be trained. Each bag x may also be a group of instances which represent a class. A bag may be represented by a set of m vectors which correspond to instances of the bag, as follows:

$$X_i = \{x_{i1}, x_{i2}, \ldots, x_{im}\}.$$ Equ. (1)

In at least one embodiment, each vector in equation (1) may be a visual descriptor (e.g., based on extracted features, concepts, and patterns) for an instance. The training data may be associated with a "weakly" supervised label indicating a positive classification (e.g., known to contain some form of cancer, known to contain at least part of a bike, and so forth) or a negative classification (e.g., known not to contain some form of cancer, known not to contain part of a bike), as follows:

$$Y_i \in Y = \{-1, 1\}.$$ Equ. (2)

Moreover, each instance $x_{ij} \in X$ may have a true label $y_{ij} \in Y$ as a hidden variable, which remains unknown while the MCIL model 102 is being learned. Accordingly, a bag may be labeled positive if at least one instance in the bag is positive, as follows:

$$y_i = \max_j y_{ij}.$$ Equ. (3)

Here, "max" may be equivalent to an "OR" operator since $y_{ij} \in Y$, $\max_j y_{ij} = 1 \Leftrightarrow \exists j$, s.t. $y_{ij} = 1$. Or in contrast, the bag may be labeled negative if all the instances in the bag are negative.

Accordingly, each bag contains multiple instances, and in MIL, instance-level classifiers h are trained based on visual features and/or patterns extracted from the sampled patches of the training images, as follows:

$$h(x_{ij}): X \rightarrow Y.$$ Equ. (4)

Moreover, MIL may be configured to learn a bag-level classifier, $H(x_i): X^m \rightarrow Y$, based on an instance-level classifier, as follows:

$$H(x_i) = \max_j h(x_{ij}).$$ Equ. (5)

MIL then adopts a loss function defined as follows:

$$L(h) = -\Sigma_{i=1}^n w_i (1(y_i = 1) \log p_i + 1(y_i = -1) \log(1 - p_i)).$$ Equ. (6)

Here, $1(*)$ is an indicator function. The loss function in equation (6) may be the standard negative log likelihood. Furthermore, the probability is represented as $p_i = p(y_i = 1 | X_i)$ and $w_i$ is the prior weight of the $i^{th}$ piece of training data (e.g., image or visual concept).

In various embodiments, MIL learns instance-level classifiers by using a "max margin framework" for multiple instance learning, such as multiple instance support vector machine (miSVM), MIL-Boost, Multiple Kernel Learning (MKL), etc. In other embodiments, the MIL may learn the instance-level classifiers by using "a softmax function" model for MIL such as noisy-or (NOR), generalized mean (GM), log-sum exponential (LSE), or integrated segmentation and recognition (ISR), as outlined in TABLE 1 provided herein. Parameter r in the softmax function for LSE and GM controls sharpness and accuracy.

TABLE 1

| | $g_l(v_l)$ | $\partial g_l(v_l)/\partial v_i$ | domain |
|---|---|---|---|
| NOR | $1 - \Pi_l(1 - v_l)$ | $\dfrac{1 - g_l(v_l)}{1 - v_i}$ | $[0,1]$ |
| GM | $\left(\dfrac{1}{m}\sum_l v_l^r\right)^{\frac{1}{r}}$ | $g_l(v_l)\dfrac{v_i^{r-1}}{\sum_l v_l^r}$ | $[0,\infty]$ |
| LSE | $\dfrac{1}{r}\ln\dfrac{1}{m}\sum_l \exp(rv_l)$ | $\dfrac{\exp(rv_i)}{\sum_l \exp(rv_l)}$ | $[-\infty,\infty]$ |
| ISR | $\dfrac{\sum_l v_l'}{1 + \sum_l v_l'}, v_l' = \dfrac{v_l}{1 - v_l}$ | $\left(\dfrac{1 - g_l(v_l)}{1 - v_i}\right)^2$ | $[0,1]$ |

With respect to Table 1, for n variables $v = \{v_1, v_2, \ldots, v_n\}$, the softmax function $g_l(v_l)$ may be defined as follows:

$$g_l(v_l) \approx \max_l(v_l) = v*, \quad \dfrac{\partial g_l(v_l)}{\partial v_i} \approx \dfrac{1(v_i = v^*)}{\sum_l 1(v_l = v^*)}.$$ Equ. (7)

Here $n = |v|$ and $g_l(v_l)$ indicates a function g which takes all $v_l$ indexed by l. Accordingly, the probability $p_i$ of a bag $X_i$ may be computed as the softmax of probability $p_i = p(y_{ij}=1|X_{ij})$ of all the instances $x_{ij}$: $p_i = g_j(p_{ij}) = g_j(\sigma(2h_{ij}))$ where $h_{ij} = h(x_{ij})$ and the sigmoid is as follows:

$$\sigma(v) = \frac{1}{1+\exp(-V)}.$$  Equ. (8)

The weights $w_{ij}$ and the derivatives $$\left(\frac{\delta \mathcal{L}}{\delta h_{ij}}\right)$$

may then be written as follows:

$$w_{ij} = -\frac{\delta \mathcal{L}}{\delta h_{ij}} = -\frac{\delta \mathcal{L}}{\delta p_i}\frac{\delta p_i}{\delta p_{ij}}\frac{\delta p_{ij}}{\delta h_{ij}}.$$  Equ. (9)

In order to expand on MIL and given training data specified in equation (1) above and the labels specified in equation (2) above, the MCIL model 102 integrates the clustering element by assuming that each instance $x_{ij}$ in a training image belongs to one of K different clusters, as discussed above. The MCIL model 102 assumes an existence of a hidden variable $y_{ij}^k \in Y$, which indicates that the instance belongs to the $k^{th}$ cluster. Thus, if an instance is classified as belonging to one of the K clusters (e.g., subclass of cancer, an object that is a component of a broader classification) the instance may be considered a positive instance for a bag at the patch level. Again, the classifier learning module 320 of the MCIL model 102 learns the instance-level classifiers for K different clusters because the object that is being trained (e.g., the object of interest) may span more than one patch (e.g., instance) and the overall image may contain multiple different objects that need to be discovered, identified, and/or segmented.

Therefore, the MCIL model 102 assumption may be formulated to incorporate K clusters (e.g., classify instances to the $k^{th}$ cluster), as follows:

$$y_i = \max_j \max_k(y_{ij}^k).$$  Equ. (10)

Here, the "max" is equivalent to an "OR" operator where $\max_k(y_{ij}^k) = 1 \Leftrightarrow \exists k, \text{ s.t. } y_{ij}^k = 1$.

Accordingly, the classifier learning module 320 learns the instance-level classifiers $h^k(x_{ij}): X \to Y$ for K different clusters for the MCIL model 102. In various embodiments, by integrating the clustering element discussed above, the MCIL model 102 may build bag-level classifiers for each cluster as follows:

$$H^k(X_i): X^m \to Y.$$  Equ. (11)

And an overall image-level classifier may be constructed as follows:

$$H(X_i): X^m \to Y.$$  Equ. (12)

$$H(X_i) = \max_k H^k(X_i) = \max_k \max_j h^k(x_{ij}).$$  Equ. (13)

The patches (e.g., instances) sampled by the image sampling module 318 may automatically be identified by one of the instance-level classifiers as belonging to a particular cluster (e.g., object in the image). MIL fails to integrate the clustering concept discussed above.

Incorporating the instance-level classifiers associated with the patch-level clustering 106, the probability discussed above, in the MCIL model 102, may be computed as the softmax of $p_i = \exists p(y_{ij}=1|X_{ij})$ of all the instances and the instance probability $p_{ij}$ may be obtained by the softmax of $p_{ij}^k = p(y_{ij}^k=1|X_{ij})$ which measures, as follows:

$$p_i = g_i(p_{ij}) = g_j(g_k(p_{ij}^k)).$$  Equ. (14)

Here the $p_{ij}^k$ means the probability of the instance $x_{ij}$ belonging to the $k^{th}$ cluster. The MCIL model 102 then uses softmax to rewrite equation (10) as follows:

$$g_j(g_k(p_{ij}^k)) = g_{jk}(p_{ij}^k) = g_k(g_j(p_{ij}^k)).$$  Equ. (15)

Functions of $g_k(p_{ij}^k)$ may be seen in Table 1. The functions g take all $p_{ij}^k$ indexed by k. Similarly, functions of $g_{jk}(p_{ij}^k)$ may be understood as a function g including all $p_{ij}^k$ indexed by k and j.

Based on equation (15), equation (14) may be rewritten as follows:

$$p_i g_j(g_k(p_{ij}^k)) = g_{jk}(p_{ij}^k) = g_{jk}(\sigma(2h_{ij}^k)), h_{ij}^k = h^k(x_{ij}).$$  Equ. (16)

In equation (16), $\sigma$ is the same as mentioned above with respect to equation (8). Therefore, the MCIL model 102 may determine the weights $(w_{ij}^k)$ and derivatives $$\left(-\frac{\delta \mathcal{L}}{\delta h_{ij}^k}\right)$$

as follows:

$$w_{ij}^k = -\frac{\delta \mathcal{L}}{\delta h_{ij}^k} = -\frac{\delta \mathcal{L}}{\delta p_i}\frac{\delta p_i}{\delta p_{ij}^k}\frac{\delta p_{ij}^k}{\delta h_{ij}^k}.$$  Equ. (17)

$$\frac{\delta \mathcal{L}}{\delta p_i} = \begin{cases} -\frac{w_i}{p_i} & \text{if } y = 1 \\ \frac{w_i}{1-p_i} & \text{if } y = -1. \end{cases}$$  Equ. (18)

$$\frac{\delta p_i}{\delta p_{ij}^k} = \frac{1-p_i}{1-p_{ij}^k} \quad (NOR)$$  Equ. (19)

$$\frac{\delta p_i}{\delta p_{ij}^k} = p_i \frac{(p_{ij}^k)^{r-1}}{\sum_{j,k}(p_{ij}^k)^r} \quad (GM)$$  Equ. (20)

$$\frac{\delta p_i}{\delta p_{ij}^k} = \frac{\exp(r p_{ij}^k)}{\sum_{j,k}\exp(r p_{ij}^k)} \quad (LSE)$$  Equ. (21)

$$\frac{\delta p_i}{\delta p_{ij}^k} = \left(\frac{1-p_i}{1-p_{ij}^k}\right)^2 \quad (ISR)$$  Equ. (22)

$$\frac{\delta p_{ij}^k}{\delta h_{ij}^k} = 2p_{ij}^k(1-p_{ij}^k)$$  Equ. (23)

As indicated above, equation (19) is associated with NOR, equation (20) is associated with GM, equation (21) is associated with LSE, and equation (22) is associated with ISR. The weights $w_{ij}^k/w_i$ in the MCIL model 102 are summarized in Table 2, as provided herein.

TABLE 2

| $w_{ij}^k/w_i$ | $y_i = 1$ | $y_i = -1$ |
|---|---|---|
| NOR | $-2p_{ij}^k$ | $\dfrac{-2p_{ij}^k(1-p_i)}{p_i}$ |

TABLE 2-continued

| $w_{ij}^k/w_i$ | $y_i = 1$ | $y_i = -1$ |
|---|---|---|
| GM | $-\dfrac{2p_i}{1-p_i} \dfrac{(p_{ij}^k)^r - (p_{ij}^k)^{r+1}}{\sum_{j,k}(p_{ij}^k)^r}$ | $2\dfrac{(p_{ij}^k)^r - (p_{ij}^k)^{r+1}}{\sum_{j,k}(p_{ij}^k)^r}$ |
| LSE | $-\dfrac{2p_{ij}^k(1-p_{ij}^k)}{1-p_i} \dfrac{\exp(rp_{ij}^k)}{\sum_{j,k}\exp(rp_{ij}^k)}$ | $\dfrac{2p_{ij}^k(1-p_{ij}^k)}{p_i} \dfrac{\exp(rp_{ij}^k)}{\sum_{j,k}\exp(rp_{ij}^k)}$ |
| ISR | $-\dfrac{2X_{ij}^k p_i}{\sum_{j,k} X_{ij}^k}, X_{ij}^k = \dfrac{p_{ij}^k}{1-p_{ij}^k}$ | $\dfrac{2X_{ij}^k(1-p_i)}{\sum_{j,k} X_{ij}^k}, X_{ij}^k = \dfrac{p_{ij}^k}{1-p_{ij}^k}$ |

Moreover, $w_i$ may be the given prior weight for the $i^{th}$ bag, and thus, in various embodiments, the classifier learning module 320 learns the instance-level classifiers for the MCIL model 102 in accordance with the example MCIL algorithm provided herein, where T is the number of iterations and a is a weight placed on each new weak instance-level classifier:

Example MCIL Algorithm:

```
Input: Bags {X₁, X₂, ..., Xₙ}, {y₁, y₂, ..., yₙ}, K, T
Output: h¹, h², ..., hᴷ
for t = 1 → T do
    for k = 1 → K do
```

$$\text{Compute weights } w_{ij}^k = -\frac{\delta \mathcal{L}}{\delta h_{ij}^k}$$

Train weak classifiers $h_t^k$ using weights $|w_{ij}^k|$ $$h_t^k = \arg\min_h \sum_{ij} 1(h(x_{ij}^k) \neq y_i)|w_{ij}^k|$$

```
    Find αₜ via line search to minimize ℒ(., hᵏ, .)
    aₜᵏ = arg minα ℒ(., hᵏ + αhₜᵏ, .)
    Update strong classifiers hᵏ ← hᵏ + αₜᵏhₜᵏ
    end for
end for
```

In the example MCIL algorithm, the outer loop is for each weak instance-level classifier and the inner loop is for the $k^{th}$ strong classifier. The example MCIL algorithm introduces latent variables $y_{ij}^k$, which denotes that the instance $x_{ij}$ belongs to the $k^{th}$ cluster, and the example MCIL algorithm learns the integrated cluster element (e.g., for patch-level clustering) by re-weighting the instance-level weight $w_{ij}^k$. If the $k^{th}$ cluster can explain instances well, the weights of instances and bags for different clusters may decrease via the re-weighting. Therefore, a competition amongst clusters to explain or classify a particular instance occurs and this allows the MCIL model 102 to discover and identify objects in an image that have different visual features and/or patterns (e.g., distinguish between different types of cancers, distinguish between different components of a bike).

In various embodiments, the input/output module 316 may be configured to accept input (e.g., from a user, automated filtering input, etc.) that provides a basis for image classification. For example, the input/output module 316 may be configured to accept input indicating that a pathologist wants to identify images with a particular type or types of cancer from a collection of unclassified images. In another example, the input/output module 316 may be configured to accept query terms from a search engine performing an image-based search or from an application configured to sort personal photographs, so that the model application module 322 can then apply the trained MCIL model 102 to a collection of unclassified images. Once applied, the input/output module 316 may be configured to output classification results (e.g., via a graphical user interface). For example, the input/output module 316 may indicate which images contain particular objects associated with one or more of the K clusters for further review by a human. Moreover, in various embodiments, the input/output module 316 may format the results based on relevance (e.g., list, rank, etc.).

Accordingly, the MCIL model 102 may learn, in a training stage, K instance-level classifiers to be used for patch-level clustering. The model application module 322 may then apply the MCIL model 102, in a model application stage, to identify and/or discover different objects associated with the instance-level classifiers that cover multiple patches. While the description above may provide particular embodiments, equations, and algorithms used to train and apply the MCIL model 102, it is contemplated that other embodiments, equations, and algorithms may also be used to train a model to perform image-level classification, patch-level clustering, and pixel-level segmentation in an integrated framework.

Illustrative Processes

Figure 4:
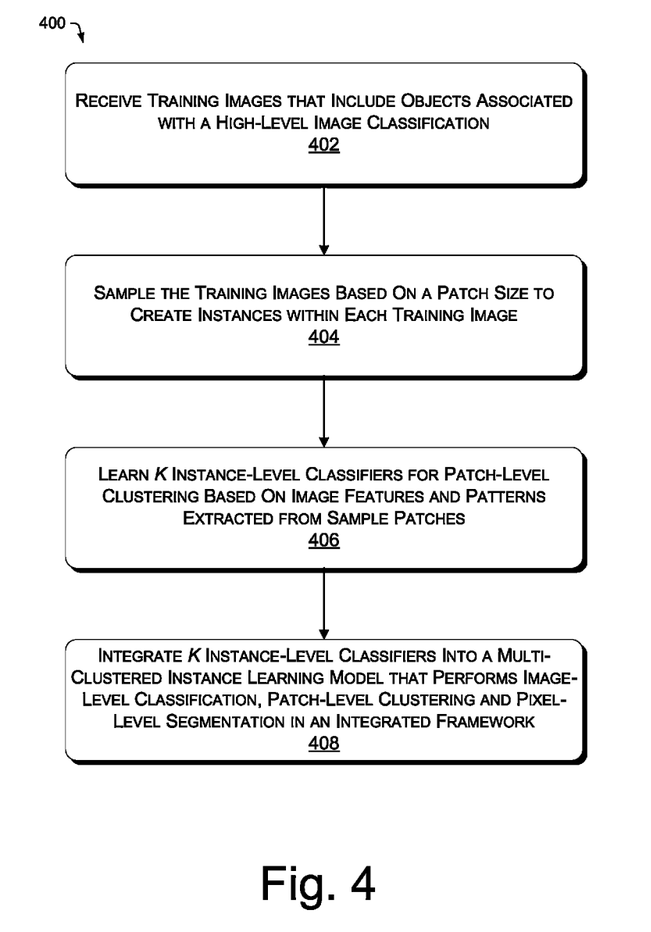
FIG. 4 illustrates an example process that builds the MCIL model during a training stage, in accordance with various embodiments.
Figure 5:
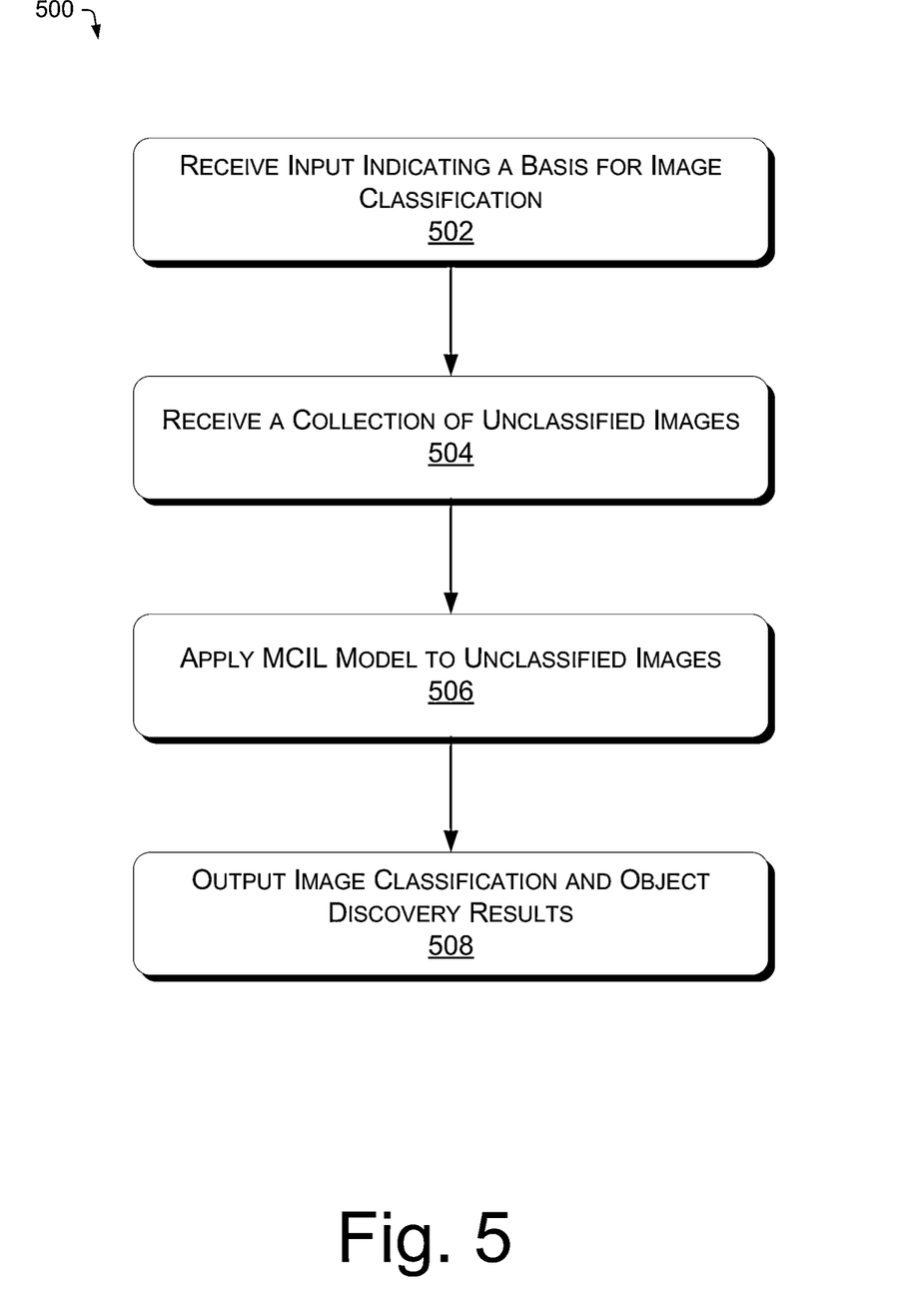
FIG. 5 illustrates an example process that applies the MCIL model to unclassified images, in accordance with various embodiments.

Example operations are described herein with reference to FIG. 4 and FIG. 5. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates an example process 400 that builds the MCIL model 102 during a training stage. The process 400 may be described in light of the example overview, the example environment, and the example architecture depicted in FIGS. 1-3. However, the process 400 is not limited to use in association with the examples in FIGS. 1-3 and may be implemented in other environments and using other architectures and/or devices.

At operation 402, the image access module 314 receives training images that include objects associated with a high-level image classification. For example, the training images may be labeled as known to contain some type of cancer or known to contain a bike or other high level object that includes other identifiable parts or components. Therefore, the objects may be subclasses or components of the high-level image classification.

At operation 404, the image sampling module 318 samples the training images based on a sample patch size (e.g., a predetermined sample patch size) so that each training images is split up into a number of different instances (e.g., patches).

At operation 406, the classifier learning module 320 learns K instance-level classifiers for patch-level clustering based on image features and/or patterns extracted from the sample patches. For example, the K instance-level classifiers may be trained in accordance with the equations and algorithm provided above. In various embodiments, the image sampling module 318 may use saliency detection to reduce an amount of space (e.g., reduce a number of patches) used to learn the instance-level classifiers and to help identify regions in the images that may contain the objects of interest. Saliency detection may assume that the object of interest is generally salient in an image and the salient detection may filter out regions of the image that are not relevant to a search query, for example.

The mechanisms used by the classifier learning module 320 to extract the image features and/or patterns may include, but are not limited to SIFT, HoG, LBP, L*a*b color histogram, attention guided color signature, color spatialet, wavelet, multi-layer rotation invariant, facial features, or any other visual feature and/or pattern extraction mechanism or combination of mechanisms.

At operation 408, the MCIL model 102 integrates the K instance-level classifiers such that the MCIL model 102 can perform image-level classification, patch-level clustering, and pixel-level segmentation in an integrated framework, as discussed above and further described with respect to FIG. 5.

FIG. 5 illustrates an example process 500 that applies the MCIL model 102 to unclassified images after the MCIL model 102 is built during the training stage in FIG. 4. The process 500 may be described in light of the example overview, the example environment, and the example architecture depicted in FIGS. 1-3. However, the process 500 is not limited to use in association with the examples in FIGS. 1-3 and may be implemented in other environments and using other architectures and/or devices.

At operation 502, the input/output module 316 receives input indicating an interest or basis for image classification. For example, a pathologist may provide input stating that he/she has an interest in identifying a particular type of cancer. In another example, a use may provide input directed to providing an image-based search for bike images that contain a particular set of components. In yet another example, a manager of a personal photo library may provide input directed to identifying images in the personal photo library that contain people.

After operation 502 or in conjunction with operation 502, at operation 504 the image access module 314 may receive a collection of unclassified images (e.g., from a medical imaging office, the Internet, a personal photo library, etc.).

At operation 506, the model application module 322 applies the trained MCIL model 102 with the trained instance-level classifiers to the collection of unclassified images. In various embodiments, the application of the MCIL model 102 may include separating unclassified images into multiple different instances (e.g., patches as discussed above), extracting image features and/or patterns for each instance, and then associating each instance with a particular cluster defined in the MCIL model 102 based on the image features and/or patterns extracted. Thus, the MCIL model 102 is able to perform image-level image classification (e.g., high-level), patch-level clustering (e.g., mid-level), and pixel-level segmentation (e.g., low-level) in an integrated framework to provide image classification and analysis based on the input received at operation 502.

At operation 508, the input/output module 316 outputs the image classification and object discovery results. For example, the input/output module 316 may provide the image that depicts pixel-level segmentation of the object or objects identified in the image, along with a distinctive indication as to what subclass or component to which the object belong (e.g., a type of cancer, a bike wheel, bike pedals, etc.). The distinctive indication may be in the form of textual labeling, color coordination (e.g., outlining), sorting images based on the high-level classification (e.g., cancer vs. no cancer) and/or the objects contained therein (e.g., example in FIG. 2).

The example processes 400 and 500 may be used and/or repeated in different environments so that an MCIL model 102 is trained to classify images and discover objects in the images that may be of interest.

CONCLUSION

Although the subject matter has been described in language specific to structural features and/or methodological acts, it is to be understood that the subject matter defined in the appended claims is not necessarily limited to the specific features or operations described above. Rather, the specific features and operations described above are described as examples for implementing the claims.

What is claimed is:
1. A method comprising:
receiving a plurality of training images, each training image including one or more objects associated with a high-level image classification;
separating each of the plurality of training images into a plurality of instances;
extracting image features from each of the plurality of instances in each of the plurality of training images;
training, via one or more processors configured with executable instructions, multiple instance-level classifiers based on the extracted image features, wherein each of the multiple instance-level classifiers are trained to associate an instance with one of the one or more objects, and wherein each of the multiple instance-level classifiers includes a learned weight based on a probability that the instance is associated with the one of the one or more objects;
implementing the multiple instance-level classifiers in an image classification model;
receiving at least one query search term;
receiving a collection of unclassified images from an image-based search using the at least one query search term; and
applying the image classification model to the collection of unclassified images.

2. The method as recited in claim 1, wherein the one or more objects are subclasses of the high-level image classification.

3. The method as recited in claim 1, wherein the one or more objects are components of the high-level image classification.

4. The method as recited in claim 1, wherein each of the instance-level classifiers are configured to perform patch-level clustering where multiple instances are associated with a single object.

5. The method as recited in claim 1, further comprising determining the plurality of instances based on saliency detection.

6. The method as recited in claim 1, wherein the image classification model, when applied to an unclassified image of the collection of unclassified images, performs image-level classification, patch-level clustering, and pixel-level segmentation in an integrated framework.

7. The method as recited in claim 1, wherein the image classification model discovers different objects that cover multiple instances in a single image.

8. The method as recited in claim 1, wherein the high-level image classification is a human-provided label.

9. The method as recited in claim 1, wherein the applying the image classification model to the collection of unclassified images includes:

identifying an unclassified image from the collection of unclassified images that includes the one of the one or more objects;

performing pixel-level segmentation by outlining the one of the one or more objects within the unclassified image to generate an annotated image; and presenting the annotated image for display.

10. One or more computer storage media storing computer-executable instructions that, when executed by one or more processors, perform operations comprising:

receiving input that provides a high-level image classification;

receiving at least one query search term;

receiving a plurality of unclassified images from an image-based search using the at least one query search term;

applying an image classification model to the plurality of unclassified images, the image classification model including multiple cluster classifiers that associate image patches with a plurality of different objects associated with the input, wherein individual ones of the multiple cluster classifiers include a learned weight based on a probability that individual ones of the image patches are associated with one of the plurality of different objects; and identifying a portion of the plurality of unclassified images that include at least one of the plurality of different objects associated with the input.

11. The one or more computer storage media as recited in claim 10, wherein the operations further comprise outputting results that indicate the portion of the plurality of unclassified images.

12. The one or more computer storage media as recited in claim 11, wherein the results convey image-level classification, patch-level clustering and pixel-level segmentation.

13. The one or more computer storage media as recited in claim 10, wherein each of the plurality of different objects are a subclass of a class provided by the input.

14. The one or more computer storage media as recited in claim 10, wherein each of the plurality of different objects are a component of a larger object provided by the input.

15. The one or more computer storage media as recited in claim 10, wherein the multiple cluster classifiers associate the image patches with the plurality of different objects based on image features extracted from the image patches.

16. The one or more computer storage media as recited in claim 10, wherein the operations further comprise separating the portion of the plurality of unclassified images into a first subset where each unclassified image contains a first object and a second subset where each unclassified image contains a second object.

17. A system comprising:

one or more processors; and one or more memories, coupled to the one or more processors, storing:

an image access module, operable on the one or more processors, that receives a plurality of training images, each training image including one or more objects associated with a high-level image classification;

a classifier learning module, operable on the one or more processors, that learns multiple instance-level classifiers based on features extracted from each of the plurality of training images, each instance-level classifier configured to associate an image patch with one of the one or more objects based at least in part on a learned weight based on a probability that the image patch is associated with the one of the one or more objects;

an input/output module, operable on the one or more processors, that receives at least one query search term and receives a collection of unclassified images from an image-based search using the at least one query search term; and a model application module, operable on the one or more processors, that applies the multiple instance-level classifiers to the collection of unclassified images to discover a subset of images that contain the one or more objects.

18. The system as recited in claim 17, wherein the one or more objects are subclasses of a class defined by the high-level image classification.

19. The system as recited in claim 17, wherein the one or more objects are components of a larger object defined by the image classification.

20. The system as recited in claim 17, wherein each of the instance-level classifiers are configured to perform patch-level clustering where multiple image patches are associated with a single object.

* * * * *